United States Patent
Zhou et al.

(10) Patent No.: US 10,573,295 B2
(45) Date of Patent: Feb. 25, 2020

(54) END-TO-END SPEECH RECOGNITION WITH POLICY LEARNING

(71) Applicant: salesforce.com, inc., San Francisco, CA (US)

(72) Inventors: Yingbo Zhou, San Jose, CA (US); Caiming Xiong, Palo Alto, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 15/878,113

(22) Filed: Jan. 23, 2018

(65) Prior Publication Data
US 2019/0130897 A1 May 2, 2019

Related U.S. Application Data

(60) Provisional application No. 62/578,369, filed on Oct. 27, 2017, provisional application No. 62/578,366, filed on Oct. 27, 2017.

(51) Int. Cl.
*G10L 15/06* (2013.01)
*G10L 15/16* (2006.01)
(Continued)

(52) U.S. Cl.
CPC ............ *G10L 15/063* (2013.01); *G06N 3/084* (2013.01); *G06N 7/005* (2013.01); *G10L 15/14* (2013.01); *G10L 15/16* (2013.01); *G10L 25/51* (2013.01)

(58) Field of Classification Search
CPC ....... G10L 15/063; G10L 15/14; G10L 15/16; G10L 25/51; G10L 15/20; G06N 7/005;
(Continued)

(56) References Cited

U.S. PATENT DOCUMENTS 9,594,983 B2 * 3/2017 Alattar .................. G06F 21/16
10,121,467 B1 * 11/2018 Gandhe ................. G10L 15/197
(Continued)

OTHER PUBLICATIONS

"Bayes by Backprop Neural Networks for Dialogue Management," Christopher Tegho, Aug. 11, 2017 (Year: 2017).*
(Continued)

*Primary Examiner* — Andrew C Flanders
(74) *Attorney, Agent, or Firm* — Haynes and Boone, LLP

(57) ABSTRACT

The disclosed technology teaches a deep end-to-end speech recognition model, including using multi-objective learning criteria to train a deep end-to-end speech recognition model on training data comprising speech samples temporally labeled with ground truth transcriptions. The multi-objective learning criteria updates model parameters of the model over one thousand to millions of backpropagation iterations by combining, at each iteration, a maximum likelihood objective function that modifies the model parameters to maximize a probability of outputting a correct transcription and a policy gradient function that modifies the model parameters to maximize a positive reward defined based on a non-differentiable performance metric which penalizes incorrect transcriptions in accordance with their conformity to corresponding ground truth transcriptions; and upon convergence after a final backpropagation iteration, persisting the modified model parameters learned by using the multi-objective learning criteria with the model to be applied to further end-to-end speech recognition.

25 Claims, 9 Drawing Sheets
(4 of 9 Drawing Sheet(s) Filed in Color)

(51) Int. Cl.
    *G06N 3/04*     (2006.01)
    *G06N 3/08*     (2006.01)
    *G06N 7/00*     (2006.01)
    *G10L 15/14*     (2006.01)
    *G10L 25/51*     (2013.01)

(58) Field of Classification Search
CPC ..... G06N 3/084; G06F 17/28; G06F 17/2775; G06K 9/6256
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 2014/0257803 A1* | 9/2014 | Yu | G06N 3/0481 704/232 |
| 2015/0055855 A1* | 2/2015 | Rodriguez | G06F 21/16 382/159 |
| 2016/0350653 A1 | 12/2016 | Socher et al. | |
| 2017/0024645 A1 | 1/2017 | Socher et al. | |
| 2017/0032280 A1 | 2/2017 | Socher et al. | |
| 2017/0140240 A1 | 5/2017 | Socher et al. | |
| 2017/0148433 A1 | 5/2017 | Catanzaro et al. | |
| 2018/0082171 A1 | 3/2018 | Merity et al. | |
| 2018/0096219 A1 | 4/2018 | Socher | |
| 2018/0096267 A1 | 4/2018 | Masekara et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0285682 A1* | 10/2018 | Najibi | G06K 9/00664 |
| 2018/0300400 A1 | 10/2018 | Paulus | |
| 2018/0357554 A1* | 12/2018 | Hazan | G06N 7/005 |
| 2019/0108432 A1 | 4/2019 | Lu et al. | |
| 2019/0108439 A1 | 4/2019 | Lu et al. | |
| 2019/0130896 A1 | 5/2019 | Zhou et al. | |
| 2019/0149834 A1 | 5/2019 | Zhou et al. | |

OTHER PUBLICATIONS

Pascanu et al., "On the Difficulty of Training Recurrent Neural Networks." Proceedings of the 30th International Conference on Machine Learning (ICML). Atlanta, Georgia. Jun. 16-21, 2013 pp. 1-9.
Paulus et al., "A Deep Reinforced Model for Abstractive Summarization," Published as a Conference Paper at the International Conference on Learning Representation. Vancouver, Canada. Apr. 30-May 3, 2018. pp. 1-12.
Pinto et al., "Supersizing Self-Supervision: Learning to Grasp from 50K Tries and 700 Robot hours," Published in: 2016 IEEE International Conference on Robotics and Automation (ICRA). Stockholm, Sweden. May 16-21, 2016. pp. 1-8.
Pirsiavash et al., "Parsing Videos of Actions with Segmental Grammars," 2014 IEEE Conference on Computer Vision and Pattern Recognition. Columbus, OH. Jun. 23-28, 2014. pp. 1-8.
Ranzato et al., "Sequence Level Training With Recurrent Neural Networks," Published as a Conference Paper at International Conference on Learning Representations (ICLR). San Juan, Puerto Rico. May 2-4, 2016 pp. 1-16.
Rennie et al., "Self-Critical Sequence Training for Image Captioning," Conference on Computer Vision and Pattern Recognition. Las Vegas Valley, NV. Jun. 26-Jul. 1, 2016. pp. 1-16.
Rusu et al., "Policy Distillation," Under Review as a Conference Paper at the International Conference on Learning Representation. San Juan, Puerto Rico. May 2-4, 2016. pp. 1-13.
Saon et al., "The IBM 2015 English Conversational Telephone Speech Recognition System," Submitted to Interspeech, The 42nd International Symposium on Computer Architecture. Portland, Oregon. Jun. 13-17, 2015. pp. 1-5.
Shazeer et al., "Outrageously Large Neural Networks: The Sparsely-Gated Mixture-of-Experts Layer," Under Review as a Conference Paper at the International Conference on Learning Representation. Toulon, France. Apr. 24-26, 2017. pp. 1-19.
Si et al., "Unsupervised Learning of Event AND-OR Grammar and Semantics from Video," 2011 International Conference on Computer Vision. Barcelona, Spain. Nov. 6-13, 2011. pp 1-8.
Sifre et al., "Rotation, Scaling and Deformation Invariant Scattering for Texture Discrimination," Accepted at 2013 IEEE Conference on Computer Vision and Pattern Recognition. Portland, Oregon. Jun. 23-27, 2013. pp. 1-8.
Silver et al., "Mastering the Game of Go with Deep Neural Networks and Tree Search," Nature, 529(7587):484-487, Jan. 2016. doi: 10.1038/nature16961. https://deepmind.com/documents/119/agz_unformatted_nature.pdf. pp. 1-37.
Silver et al., "Mastering the Game of Go Without Human Knowledge," DeepMind, Nature, 550. London, UK. 2017. https://deepmind.com/documents/119/agz_unformatted_nature.pdf. pp. 1-42.
Srivastava et al., "Dropout: A Simple Way to Prevent Neural Networks from Overfilling," Journal of Machine Learning Research, vol. 15, No. 1. University of Toronto. Jun. 14, 2014. pp. 1-30.
Su et al., "Sample-Efficient Actor-Critic Reinforcement Learning with Supervised Data for Dialogue Management," The 18th Annual SIGdial Meeting on Discourse and Dialogue (SIGDIAL). Saarbrücken, Germany. Aug. 15-17, 2017. pp. 1-11.
Sutton et al., "Between MDPs and Semi-MDPs: A Framework for Temporal Abstraction in Reinforcement Learning," Artificial Intelligence, vol. 112, Issues 1-2. Essex, UK. Aug. 1999. pp. 1-31.
Teh et al., "Distral: Robust Multitask Reinforcement Learning," In International Conference on Learning Representations. Toulon, France. Apr. 24-26, 2017. pp. 1-13.
Teney et al., "Graph-Structured Representations for Visual Question Answering," 2017 IEEE Conference on Computer Vision and Pattern Recognition (CVPR). Honolulu, HI. Jul. 21-26, 2017. pp. 1-17.
Tessler et al., "A Deep Hierarchical Approach to Lifelong Learning in Minecraft," Proceedings of the 31st Conference on Artificial Intelligence. San Francisco, California. Feb. 4-10, 2017. pp. 1-9.
Tieleman et al. "Lecture 6.5-RMSProp: Divide the gradient by a running average of its recent magnitude," COURSERA: Neural Networks for Machine Learning. Jan. 1, 2012. pp. 1-4.
Van Den Oord et al., "Conditional Image Generation with PixelCNN Docoders," 30th Conference on Neural Information Processing Systems (NIPS 2016). Barcelona, Spain. Dec. 5-10, 2016. pp. 1-9.
Vaswani et al., "Attention is All You Need," 31st Conference on Neural Information Processing Systems (NIPS 2017). Long Beach, CA. Dec. 4-9, 2017. pp. 1-15.
Vezhnevets et al., "Strategic Attentive Writer for Learning Macro-Actions," 29th Conference on Neural Information Processing Systems (NIPS 2016). Barcelona, Spain. Dec. 5-10, 2016. pp. 1-10.
Wang et al., "Sample Efficient Actor-Critic with Experience Replay," Published as a Conference Paper at the International Conference on Learning Representation. Toulon, France. Apr. 24-26, 2017. pp. 1-20.
Williams, "Simple Statistical Gradient-Following Algorithms for Connectionist Reinforcement Learning," Appears in Proceedings of the 9th International Workshop on Machine Learning (M92), vol. 8, Issue 3-4. May 1992. pp. 1-27.
Wu et al., "Introduction to Convolutional Neural Networks," National Key Lab for Novel Software Technology. Nanjing University, China. May 1, 2017. pp. 1-31.
Wu et al., "On Multiplicative Integration with Recurrent Neural Networks," 30th Conference on Advances in Neural Information Processing Systems (NIPS). Barcelona, Spain. Dec. 5-10, 2016 pp. 1-10.

(56) References Cited

OTHER PUBLICATIONS

Xiong et al., "Dynamic Coattention Networks for Question Answering," Published as a Conference Paper at the International Conference on Learning Representations. Toulon, France. Apr. 24-26, 2017. pp. 1-14.
Xiong et al., "The Microsoft 2016 Conversational Speech Recognition System," In Acoustics, Speech and Signal Processing (ICASSP), International Conference on IEEE. New Orleans, Louisiana. Mar. 5-9, 2017. pp. 1-5.
Graves et al., "Towards End-to-End Speech Recognition with Recurrent Neural Networks," Proceedings of the 31st Conference on Machine Learning. Beijing, China. Jun. 21, 2014 pp. 1-9.
Lu et al., "Multitask Learning with CTC and Segmental CRF for Speech Recognition," Interspeech 2017. Stockholm, Sweden. Aug. 20-24, 2017. pp. 1-5.
Luo et al., "Learning Online Alignments with Continuous Rewards Policy Gradient," 29th Conference on Neural Information Processing Systems. Barcelona, Spain. Dec. 5-10, 2016. pp. 1-9.
Norouzi et al., "Reward Augmented Maximum Likelihood for Neural Structured Prediction," Conference on Neural Information Processing Systems. Barcelona, Spain. Dec. 5-10, 2016. pp. 1-11.
Zhou et al., "Improving End-to-End Speech Recognition with Policy Learning," IEEE International Conference on Acoustics, Speech and Signal Processing. New Orleans, Louisiana. Mar. 5-9, 2017. pp. 1-5.
International Search Report and Written Opinion issued by the International Searching Authority on Jan. 15, 2019 or PCT App. No. PCT/US2018/057446. pp. 1-18.
Amodei et al., "Deep Speech 2: End-to-End Speech Recognition in English and Mandarin," Published as a Conference Paper at the 33rd International Conference on Machine Learning. New York, NY. Jun. 19-24, 2016. pp. 1-28.
Anderson et al., "Bottom-Up and Top-Down Attention for Image Captioning and VQA," Conference on Computer Vision and Pattern Recognition 2018 full oral, Winner of the 2017 Visual Question Answering challenge. Honolulu, HI. Jul. 21-26, 2017. pp. 1-15.
Andreas et al., "Modular Multitask Reinforcement Learning with Policy Sketches," Proceedings of the 34th International Conference on Machine Learning. Sydney, Australia. Aug. 6-11, 2017. pp. 1-11.
Ba et al., "Layer Normalization," arXiv:1607.0645. 2016. https://arxiv.org/pdf/1607.06450.pdf. pp. 1-14.
Bacon et al., "The Option-Critic Architecture," Proceedings of the 31st Conference on the Association for the Advancement of Artificial Intelligence. San Francisco, California. Feb. 4-9, 2017. pp. 1-9.
Bahdanau et al., "An Actor-Critic Algorithm for Sequence Prediction," Published as a conference paper at the International Conference on Learning Representation. Toulon, France. Apr. 24-26, 2017. pp. 1-17.
Bahdanau et al., "End-to-End Attention-Based Large Vocabulary Speech Recognition," In International Conference on Acoustics, Speech and Signal Processing, IEEE. Lujiazui, Shanghai. Mar. 20-25, 2016. pp. 1-8.
Baum et al., "Statistical Inference for Probabilistic Functions of Finite State Markov Chains," The Annals of Mathmatical Statistics, vol. 37, Issue 6. Princeton, NJ. 1966. pp. 1-10.
Bengio et al., "Deep Learning of Representations for Unsupervised and Transfer Learning," In Journal of Machine Learning Research: Workshop on Unsupervised and Transfer Learning. 2012. pp. 1-21.
Brown et al., "The Mathematics of Statistical Machine Translation: Parameter Estimation," Association for Computational Linguistics, vol. 19, No. 2. MIT—Massachusetts Institute of Technology. Jun. 1, 1993. pp. 1-50.
Chaplot et al., "Gated-Attention Architectures for Task-Oriented Language Grounding," The Association for the Advancement of Artificial Intelligence. New Orleans, Louisiana. Feb. 2-7, 2018. pp. 1-11.
Chaubard et al., "CS 224D: Deep Learning for NLP, Lecture Notes: Part 1," Spring 2015. https://cs224d.stanford.edu/lecture_notes/LectureNotes1.pdf. pp. 1-11.
Chaubard et al., "CS 224D: Deep Learning for NLP, Lecture Notes: Part 2," Spring 2015. https://cs224d.stanford.edu/lecture_notes/LectureNotes2.pdf. pp. 1-11.
Chaubard et al., "CS 224D: Deep Learning for NLP, Lecture Notes: Part 3," Spring 2015. https://cs224d.stanford.edu/lecture_notes/LectureNotes3.pdf. pp. 1-11.
Chaubard et al., "CS 224D: Deep Learning for NLP, Lecture Notes: Part 4," Spring 2015. https://cs224d.stanford.edu/lecture_notes/LectureNotes4.pdf. pp. 1-12.
Chaubard et al., "CS 224D: Deep Learning for NLP, Lecture Notes: Part 5," Spring 2015. https://cs224d.stanford.edu/lecture_notes/LectureNotes5.pdf. pp. 1-6.
Cho et al., "On the Properties of Neural Machine Translation: Encoder-Decoder Approaches," Proceedings of the Syntax, Semantics and Structure in Statistical Translation (SSST-8), Eighth Workshop. Doha, Qatar. Oct. 25, 2014. pp. 1-9.
Chollet et al., "Xception: Deep Learning with Depthwise Separable Convolutions," Conference: 2017 IEEE Conference on Computer Vision and Pattern. Honolulu, HI. Jul. 21-26, 2017. pp. 1-8.
Chorowski et al., "Towards Better Decoding and Language Model Integration in Sequence to Sequence Models," Interspeech 2017, Situated Interaction. Stockholm, Sweden. Aug. 20-24, 2017. pp. 1-6.
Collobert et al., "Wav2Letter: an End-to-End ConvNet-based Speech Recognition System," Under review as a Conference Paper at the International Conference on Learning Representation. Toulon, France. Apr. 24-26, 2017. pp. 1-8.
Dai et al., "R-FCN: Object Detection via Region-Based Fully Convolutional Networks," 30th Conference on Neural Information Processing Systems (NIPS 2016), Barcelona, Spain. Dec. 5-10, 2016. pp. 1-11.
Fan et al., "Deep Learning for Audio," 2017. Slide Show. http://slazebni.cs.illinois.edu/spring17/lec26_audio.pdf. pp. 1-101.
Gal et al., "A Theoretically Grounded Application of Dropout in Recurrent Neural Networks," 30th Conference on Neural Information Processing Systems (NIPS 2016). Barcelona, Spain. Dec. 5-10, 2016. pp. 1-9.
Goodfellow et al., "Convolutional Networks," Lecture Slides for Chapter 9 of Deep Learning. MIT—Massachusetts Institute of Technology. Sep. 12, 2016. http://www.deeplearningbook.org/slides/09_conv.pdf. pp. 1-27.
Goyal et al., "Making the V in VQA Matter: Elevating the Role of Image Understanding in Visual Question Answering," eprint asXiv:1612.00837. https://arxiv.org/pdf/1612.00837.pdf. Dec. 2016. pp. 1-11.
Graves et al., "Connectionist Temporal Classification: Labelling Unsegmented Sequence Data with Recurrent Neural Networks," Appearing in Proceedings of the 23rd International Conference on Machine Learning. Pittsburgh, PA. Jun. 25-29, 2006. pp. 1-8.
Graves et al., "Towards End-to-End Speech Recognition with Recurrent Neural Networks," Proceedings of the 31st International Conference on Machine Learning, vol. 32. Beijing, China. Jun. 21-26, 2014. pp. 1-9.
Hannun et al., "First-Pass Large Vocabulary Continuous Speech Recognition Using Bi-Directional Recurrent DNNs," arXiv preprint arXiv:1408.2873, 2014. https://arxiv.org/pdf/1408.2873.pdf. pp. 1-7.
Hashimoto et al., "A Joint Many-Task Model: Growing a Neural Network for Multiple NLP Tasks," Proceedings of the 2017 Conference on Empirical Methods in Natural Language Processing: Association for Computational Liguistics. Copenhagen, Denmark. Sep. 7-11, 2017. pp. 1-11.
He et al., "Deep Residual Learning for Image Recognition," Conference on Computer Vision and Pattern Recognition. Las Vegas Valley, NV. Jun. 26-Jul. 1, 2016. pp. 1-12.
He et al., "Delving Deep into Rectifiers: Surpassing Human-Level Performance on ImageNet Classification," Proceedings of the IEEE International Conference on Computer Vision. Washington, DC. Dec. 7-13, 2015. pp. 1-11.
Hermann et al., "Grounded Language Learning in a Simulated 3D World," Deep Mind. London, UK 2017. arXiv preprint arXiv:1706.07230. pp. 1-22.
Hinton et al., "Deep Neural Networks for Acoustic Modeling in Speech Recognition," IEEE Signal Processing Magazine, vol. 29, No. 6. 2012. pp. 1-27.

(56) References Cited

OTHER PUBLICATIONS

Ioffe et al., "Batch Normalization: Acceleration Deep Network Training by Reducing Internal Covariate Shift," Proceedings of the 32nd International Conference on Machine Learning, JMLR: W&CP, vol. 37. Mar. 2, 2015. pp. 1-9.
Johnson et al., "The Malmo Platform for Artificial Intelligence Experimentation," Proceedings of the 25th International Joint Conference on Artificial Intelligence. New York City, New York. Jul. 9-15, 2016. pp. 1-2.
Kempka et al., "ViZDoom: A Doom-based AI Research Platform for Visual Reinforced Learning," Proceedings of IEEE Conference of Computational Intelligence in Games 2016. Sep. 20-23, 2016. pp. 1-8.
Krishna et al., "Visual Genome: Connecting Language and Vision Using Crowdsourced Dense Image Annotations," Published 2016 in International Journal of Computer Vision. Feb. 23, 2016. pp. 1-44.
Kulkarni et al., "Hierarchical Deep Reinforcement Learning: Integrating Temporal Abstraction and Intrinsic Motivation," In Advances in Neural Information Processing Systems (NIPS). Barcelona, Spain. Dec. 5-10, 2016. pp. 1-14.
Levine et al., "End-to-End Training of Deep Visuomotor Policies," Journal of Machine Learning Research, vol. 17, No. 39. Berkeley, CA. 2016. pp. 1-40.
Levine et al., "Learning Hand-Eye Coordination for Robotic Grasping with Deep Learning and Large-Scale Data collection," The 2016 International Symposium on Experimental Robotics (ISER 2016). Tokyo, Japan. Oct. 3-6, 2016. pp. 1-12.
Li, "Deep Reinforcement Learning: A Overview," Proceedings of SAI Intelligent Systems Conference (IntelliSys). London, United Kingdom. Sep. 21-22, 2016. pp. 1-70.
Lin et al., "A Structured Self-Attentive Sentence Embedding," Published as a Conference Paper at the International Conference on Learning Representation. Toulon, France. Apr. 24-26, 2017. pp. 1-15.
Luo et al., "Learning Online Alignments with Continuous Rewards Policy Gradient," 29th Conference on Neural Information Processing Systems (NIPS 2016). Barcelona, Spain. Dec. 5-10, 2016. pp. 1-9.
Miao et al., "EESEN: End-to-End Speech Recognition Using Deep RNN Models and WFST-Based Decoding," In 2015 IEEE Workshop on Automatic Speech Recognition and Understanding (ASRU). Scottsdale, AZ. Dec. 13-17, 2015. pp. 1-8.
Mirowski et al., "Learning to Navigate in Complex Environments," Under Review as a Conference Paper at the International Conference on Learning Representation. Toulon, France. Apr. 24-26, 2017. pp. 1-9.
Mnih et al., "Asynchronous Methods for Deep Reinforcement Learning," Proceedings of the 33rd International Conference on Machine Learning, JMLR: W&CP, vol. 48. New York, NY. Jun. 19-24, 2017. pp. 1-19.
Mnih et al., "Human-Level Control Through Deep Reinforcement Learning," Google DeepMind, vol. 518, Nature 529. London, UK. Feb. 26, 2015. pp. 1-13.
Narasimhan et al., "Language Understanding for Text-Based Games Using Deep Reinforcement Learning," Proceedings of the Conference on Empirical Methods in Natural Language Processing. Lisbon, Portugal. Sep. 17-21, 2015. pp. 1-11.
Panayotov et al., "Librispeech: An ASR Corpus Based on Public Domain Audio Books," In 2015 IEEE International Conference on Acoustics, Speech and Signal Processing (ICASSP). Brisbane, QLD, Australia. Apr. 19-24, 2015. pp. 1-5.
Parisotto et al., "Actor-Mimic Deep Multitask and Transfer Reinforcement Learning," Published as a Conference Paper at the International Conference on Learning Representation. San Juan, Puerto Rico. May 2-4, 2016. pp. 1-16.
Inan et al., "Tying Word Vectors and Word Classifiers: A Loss Framework for Language Modeling," published as a conference paper at ICLR 2017, arXiv:1611.01462v3, Mar. 11, 2017, pp. 1-13.
Sennrich et al., "Neural Machine Translation of Rare Words with Subword Units," arXiv:1508.07909v5, 2016, pp. 1-11.

\* cited by examiner $$s(i,j,d) = \sum_{f=0}^{F-1}\sum_{t=0}^{T-1} x(f,t,d)c(i-f, j-t, d)$$

$$o(i,j,n) = \sum_{k=0}^{D-1} s(i,j,k)w(k,n)$$

where $d \in \{1, \ldots, D\}$ and $n \in \{1, 2, \ldots, N\}$.

| Method | dev93 CER | dev93 WER | eval92 CER | eval92 WER |
|---|---|---|---|---|
| Baseline | 4.07% | 9.93% | 2.59% | 6.42% |
| Policy (eq. 5) | 3.71% | 9.46% | 2.31% | 5.85% |
| Policy (eq. 7) | 3.52% | 9.21% | 2.10% | 5.53% |

FIG. 7B

| Dataset | | Baseline | Policy |
|---|---|---|---|
| dev-clean | CER | 1.76% | 1.69% |
| | WER | 5.33% | 5.10% |
| test-clean | CER | 1.87% | 1.75% |
| | WER | 5.67% | 5.42% |
| dev-other | CER | 6.60% | 6.26% |
| | WER | 14.88% | 14.26% |
| test-other | CER | 6.58% | 6.25% |
| | WER | 15.18% | 14.70% |

FIG. 7C

| Method | WER |
|---|---|
| Hannun et al. [25] | 14.10% |
| Bahdanau et al. [7] | 9.30% |
| Graves and Jaitly [4] | 8.20% |
| Wu et al. [26] | 8.20% |
| Miao et al. [5] | 7.34% |
| Chorowski and Jaitly [27] | 6.70% |
| Human [6] | 5.03% |
| Amodei et al. [6]* | 3.60% |
| Ours | 5.53% |
| Ours (LibriSpeech) | 4.67% |

FIG. 7D

| Method | test-clean | test-other |
|---|---|---|
| Collobert et al. [28] | 7.20% | - |
| Amodei et al. [6]* | 5.33% | 13.25% |
| ours | 5.42% | 14.70% |

END-TO-END SPEECH RECOGNITION WITH POLICY LEARNING

PRIORITY AND CROSS-REFERENCED APPLICATIONS

This application claims the benefit of U.S. Provisional Application No. 62/578,369, entitled "END-TO-END SPEECH RECOGNITION WITH POLICY LEARNING". The PRIORITY application is hereby incorporated by reference herein for all purposes.

This application claims the benefit of U.S. Provisional Application No. 62/578,366, entitled "DEEP LEARNING-BASED NEURAL NETWORK, ARCHITECTURE, FRAMEWORKS AND ALGORITHMS", filed Oct. 27, 2017. The related application is hereby incorporated by reference herein for all purposes.

This application cross-references U.S. application Ser. No. 15/851,579, entitled "A DEEP REINFORCED MODEL FOR ABSTRACTIVE SUMMARIZATION", filed Dec. 21, 2017. The cross-referenced application is hereby incorporated by reference herein for all purposes.

FIELD OF THE TECHNOLOGY DISCLOSED

The technology disclosed relates generally to jointly training deep neural network based, end-to-end speech recognition models with maximum likelihood combined with policy gradient to improve the relative performance for the end-to-end models. The speech recognition models are utilized for speech-to-text, full transcription and automated speech recognition (ASR), which is also referred to as large-vocabulary continuous speech recognition (LVCSR) and uses a set of words referred to as bi-grams, tri-grams, etc. as the basic unit.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

One limitation of deep end-to-end speech recognition models is that there exists a disparity between the objective function used during training and the evaluation criteria used during inference. In the training stage, a deep end-to-end speech recognition model optimizes a differentiable maximum likelihood objective function (MLOF) such as connectionist temporal classification (CTC). However, the recognition accuracy during inference is evaluated based on discrete and non-differentiable performance metrics such as word error rate (WER) and character error rate (CER), which calculate the minimum string edit distance between the ground truth transcription and the output transcription. Thus, due to this disparity, it remains unclear how well the model approximates real-world speech during inference.

As discussed above, the model uses maximum likelihood objective function (MLOF) to maximize the likelihood of training data, as opposed to optimizing error rate evaluation metrics which actually quantify recognition quality. MLOF maximizes the log probability of getting the whole transcription completely correct. The relative probabilities of incorrect transcriptions are therefore ignored, which implies that they are all equally bad. In most cases however, transcription performance is assessed in a more nuanced way. MLOF makes no distinction between incorrect transcriptions and equally penalizes them through normalization regardless of how near or far they are from the ground truth transcriptions.

In contrast, performance metrics such as WER and CER typically aim to reflect the plausibility of incorrect transcriptions. For example, WER penalizes less for an output transcription that has less edit distance to the ground truth transcription. This makes it possible for incorrect transcriptions with low WER to be preferred over those with high WER.

Optimizing model parameters with the appropriate training function is crucial to achieving good model performance. An opportunity arises to directly improve a deep end-to-end speech recognition model with respect to the evaluation metrics such as WER and CER, thereby improving relative performance for an end-to-end speech recognition model as compared to the same model learned through maximum likelihood. The disclosed systems and methods make it possible to achieve a new state-of-the art WER for the deep end-to-end speech recognition model.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a computer-implemented method of training a deep end-to-end speech recognition model, including using multi-objective learning criteria to train a deep end-to-end speech recognition model on training data comprising speech samples temporally labeled with ground truth transcriptions. The multi-objective learning criteria updates model parameters of the model over one thousand to millions of backpropagation iterations by combining, at each iteration. The disclosed method also includes a maximum likelihood objective function that modifies the model parameters to maximize a probability of outputting a correct transcription and a policy gradient function that modifies the model parameters to maximize a positive reward defined based on a non-differentiable performance metric which penalizes incorrect transcriptions in accordance with their conformity to corresponding ground truth transcriptions; and upon convergence after a final backpropagation iteration, persisting the modified model parameters learned by using the multi-objective learning criteria with the model to be applied to further end-to-end speech recognition.

Other aspects and advantages of the technology disclosed can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 6 shows the equations for operations performed by the depth-wise separable convolution with D input channels and N output channels for the deep end-to-end speech recognition model, in accordance with one or more implementations of the technology disclosed.

FIG. 7A shows a table of the word error rate results from the WSJ dataset.

FIG. 7B shows performance of the model when utilizing the LibriSpeech dataset.

FIG. 7C shows comparative results with other end-to-end methods on WSJ eval92 dataset.

FIG. 7D shows comparative results with other end-to-end methods on LibriSpeech dataset.

DETAILED DESCRIPTION

Figure 1:
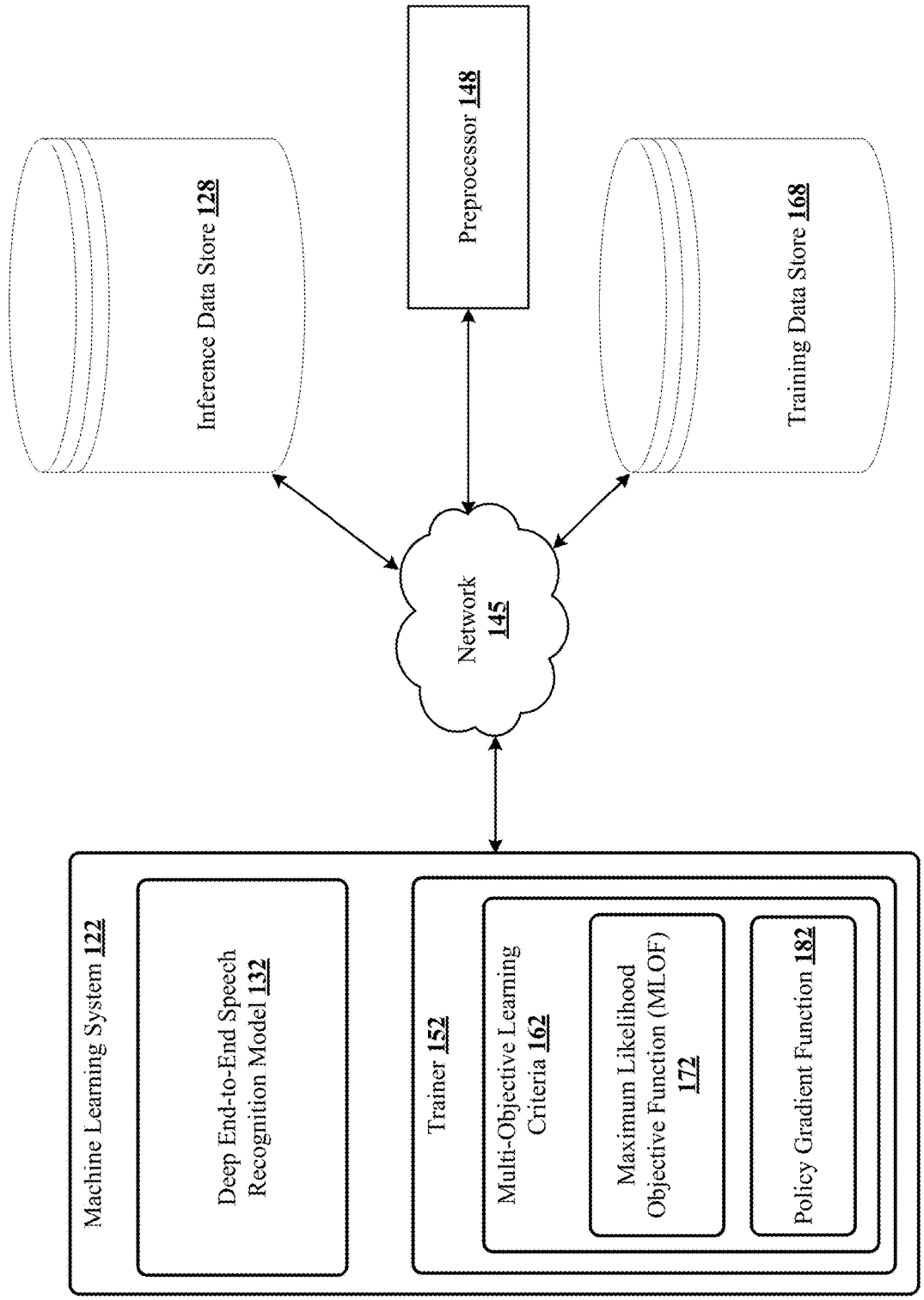
FIG. 1 depicts an exemplary system for jointly training, with maximum likelihood and policy gradient, a deep neural network based, end-to-end speech recognition model according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Deep neural networks are the basis for some of the most accurate speech recognition systems in research and production. Neural network based acoustic models are commonly used as sub-components in a Gaussian mixture model (GMM) and hidden Markov model (HMM) based hybrid system. Alignment is necessary to train the acoustic model and a two-stage alignment and frame prediction training process is required for a typical hybrid system. A drawback of such a process is the disconnect that exists between the acoustic model training and the final objective. The end-to-end neural network based speech models bypass this two-stage training process by directly maximizing the likelihood of the data.

While the end-to-end models are commonly trained with maximum likelihood, the final performance metric for a speech recognition system is typically word error rate (WER) or character error rate (CER), resulting in a mismatch between the objective that is optimized and the evaluation metric. In an ideal setting the model should be trained to optimize the final metric. However, since the metrics are commonly discrete and non-differentiable, it is very difficult to optimize in practice.

Reinforcement learning (RL) has been shown to be effective on improving performance for problems that have a non-differentiable metric, through policy gradient. In particular, REINFORCE algorithm enables one to estimate the gradient of the expected reward by sampling from the model. REINFORCE algorithm makes weight adjustments in a direction that lies along the gradient of expected reinforcement without explicitly computing gradient estimates or storing information from which such estimates could be computed, and thus can be naturally integrated with backpropagation. In particular, with policy learning one can directly optimize on the otherwise non-differentiable performance metric.

Connectionist temporal classification (CTC) is a widely used method for maximum likelihood learning in end-to-end speech recognition models. However, there is usually a disparity between the negative maximum likelihood and the performance metric used in speech recognition—that is, the character error rate (CER) or word error rate (WER), resulting in mismatch between objective function and metric during training.

The disclosed technology reduces the mismatch between the training and inference conditions of deep end-to-end speech recognition models by training them on multi-objective learning criteria; that is, jointly training with maximum likelihood and policy gradient. The multi-objective learning criteria applies, in combination, the maximum likelihood objective function (MLOF) as connectionist temporal classification (CTC), and a reinforcement learning (RL)-based policy gradient function that optimizes a performance metric, such as CER or WER, defined over output transcriptions. The multi-objective learning criteria utilized in joint training improves relative performance for the disclosed end-to-end model, increasing computational efficiency and improving speech recognition accuracy.

The effectiveness of utilizing joint training of end-to-end models with self-critical policy learning and maximum likelihood is compared with published methods for end-to-end trainable, deep speech recognition models. The disclosed joint training of the end-to-end deep speech recognition models with self-critical sequence training (SCST) policy learning and maximum likelihood improves performance significantly. SCST is also efficient during training, as only one sampling process and two metric calculations are necessary.

The combination of joint training with policy learning and maximum likelihood gives a relative performance improvement on both Wall Street Journal (WSJ) and Libri Speech datasets of 4% to 13% for the end-to-end model as compared to the same model learned through maximum likelihood. A system for joint training of end-to-end models with self-critical policy learning and maximum likelihood is described next.

FIG. 1 shows architecture 100 for disclosed joint training of end-to-end models with self-critical sequence training policy learning and maximum likelihood for deep neural network based, end-to-end speech recognition models. Architecture 100 includes machine learning system 122 with deep end-to-end speech recognition model 132 that includes between one million and five million parameters and is described relative to FIG. 7 infra. Machine learning system 122 also includes trainer 152 with multi-objective learning criteria 162 which includes maximum likelihood objective function (MLOF) 172 and policy gradient function 182. Trainer 152 is described in detail relative to FIG. 2.

Continuing the description of FIG. 1, architecture 100 also includes training data store 168 for training a deep end-to-end speech recognition model 132 and inference data store 128 for testing a deep end-to-end speech recognition model 132 that has been trained. Training data store 168 and inference data store 128 include speech samples temporally labelled with text transcriptions. In one implementation the samples include the Wall Street Journal (WSJ) dataset and the Libri Speech dataset—a large, 1000 hour, corpus of English read speech derived from audiobooks in the LibriVox project, sampled at 16 kHz. The accents are various and not marked, but the majority are US English. In another use case, a different set of samples could be utilized as audio speech and stored in inference data store 174. In one implementation, training data store 168 and inference data store 128 also store sample speech variations on original speech samples temporally labelled with text transcriptions, including modifying a particular original speech sample to independently vary tempo and pitch of the original speech sample while retaining the temporally labelled text transcription of the original speech sample, thereby producing multiple sample speech variations having multiple degrees of variation from the original speech sample and having the temporally labelled text transcription of the original speech sample. "A Deep Reinforced Model for Abstractive Summarization", which is incorporated by reference, describes training with the sample speech variations in detail.

Architecture 100 also includes preprocessor 148 which computes a spectrogram for each of the input speech sample waves. The spectrograms capture the frequencies that make up the sound—a representation of the spectrum of frequencies of sound and how they change over time. One implementation utilizes sound exchange utility (SoX) to convert between formats of computer audio files and to apply various effects to these sound files. In another implementation a different audio manipulation tool can be utilized.

Further continuing the description of FIG. 1, architecture 100 also includes network 145 that interconnects the elements of architecture 100: machine learning system 122, inference data store 128, training data store 168 and preprocessor 148 in communication with each other. The actual communication path can be point-to-point over public and/or private networks. Some items, such as data from data sources, might be delivered indirectly, e.g. via an application store (not shown). The communications can occur over a variety of networks, e.g. private networks, VPN, MPLS circuit, or Internet, and can use appropriate APIs and data interchange formats, e.g. REST, JSON, XML, SOAP and/or JMS. The communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/password, OAuth, Kerberos, Secure ID, digital certificates and more, can be used to secure the communications.

FIG. 1 shows an architectural level schematic of a system in accordance with an implementation. Because FIG. 1 is an architectural diagram, certain details are intentionally omitted to improve the clarity of the description.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

In some implementations, the elements or components of architecture 100 can be engines of varying types including workstations, servers, computing clusters, blade servers, server farms, or any other data processing systems or computing devices. The elements or components can be communicably coupled to the databases via a different network connection.

While architecture 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Figure 2:
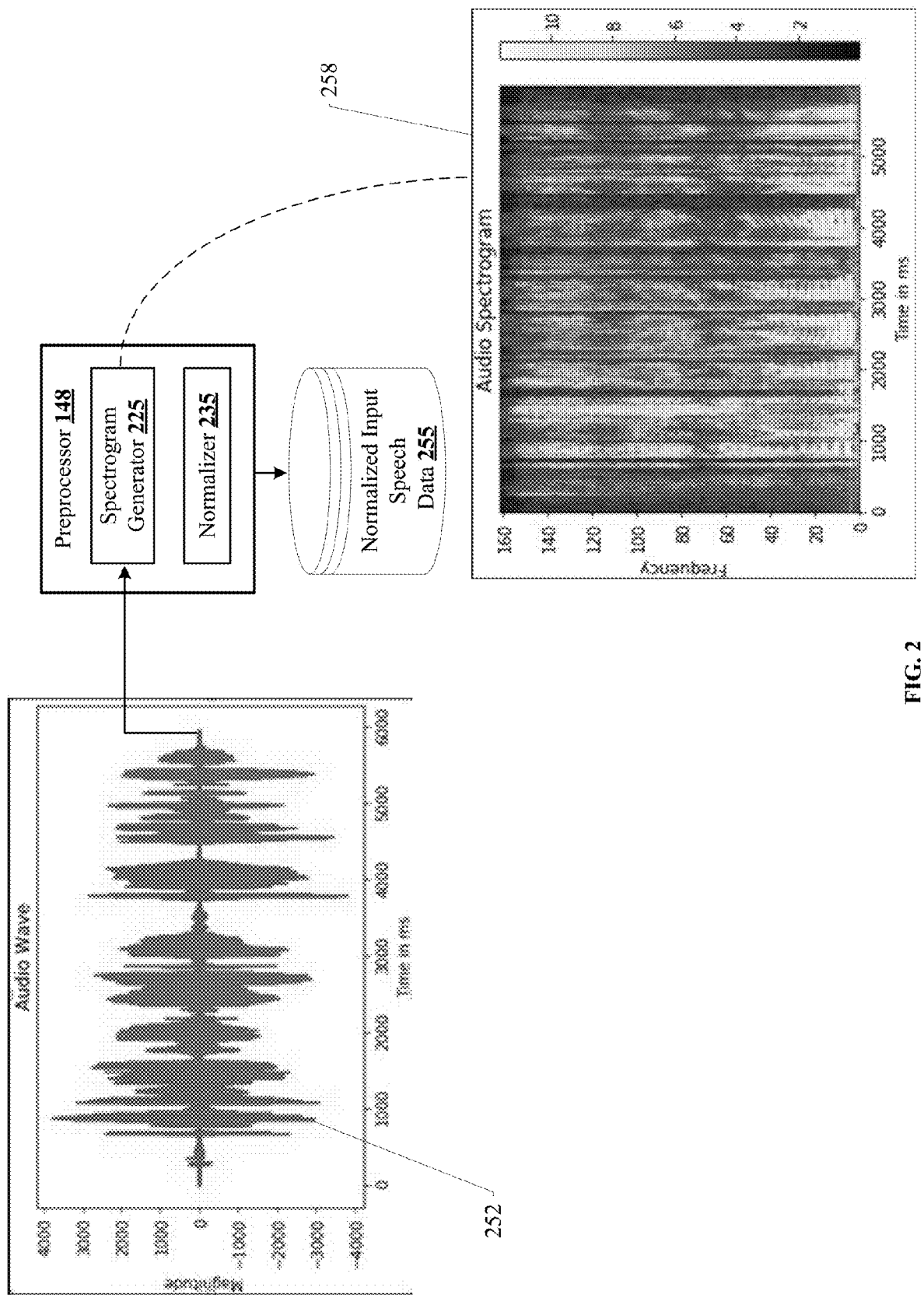
FIG. 2 shows a block diagram for the preprocessor for jointly training the deep neural network based, end-to-end speech recognition model of FIG. 1.

FIG. 2 shows a block diagram for preprocessor 148 which includes spectrogram generator 225 which takes as input, sampled speech audio wave 252 and computes, for each speech input, a spectrogram with a sliding 20 ms window and 10 ms step size. In another example, the sliding window and steps sizes can be different. Audio spectrogram 258 shows the audio spectrogram graph for example input speech audio wave 252 that represents the transcription, "A tanker is a ship designed to carry large volumes of oil or other liquid cargo." This shows the frequencies that make up the speech sample—a representation of the spectrum of frequencies of sound and how they change over time, from left to right. In the example audio spectrogram 258, the x axis represents time in ms, the y axis illustrates frequency in Hertz (Hz) and the colors shown on the right side show power per frequency in decibels per Hertz (dB/Hz).

Continuing with FIG. 2, preprocessor 148 also includes normalizer 235 that normalizes each spectrogram to have zero mean and unit variance, and in addition, normalizes each feature to have zero mean and unit variance based on the training set statistics. Normalization changes only the numerical values inside the spectrogram. Normalizer 235 stores the results in normalized input speech data 255.

Figure 3A:
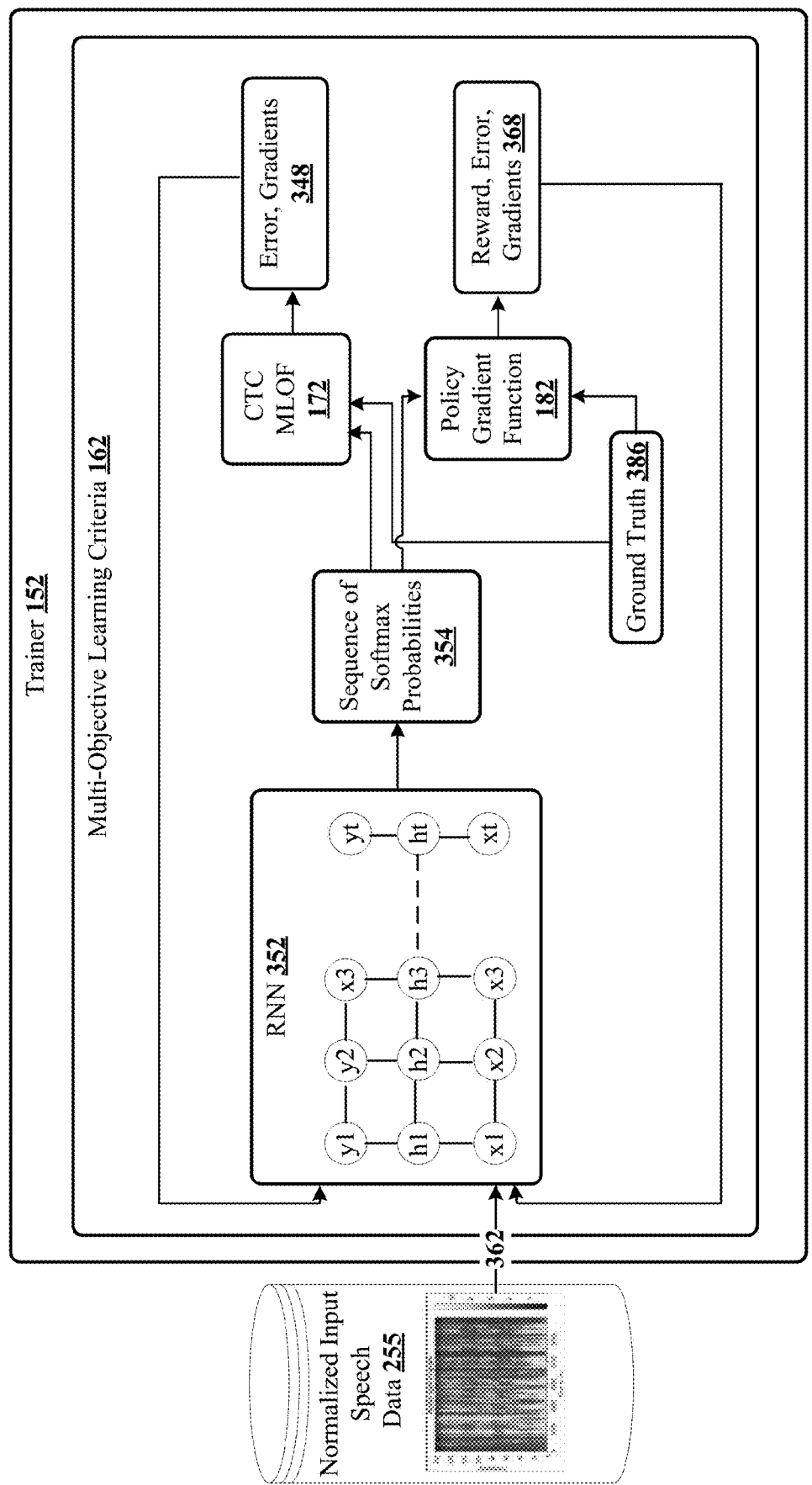
FIG. 3A shows a detailed block diagram of the trainer for the deep neural network based, end-to-end speech recognition model of FIG. 1.
Figure 3B:
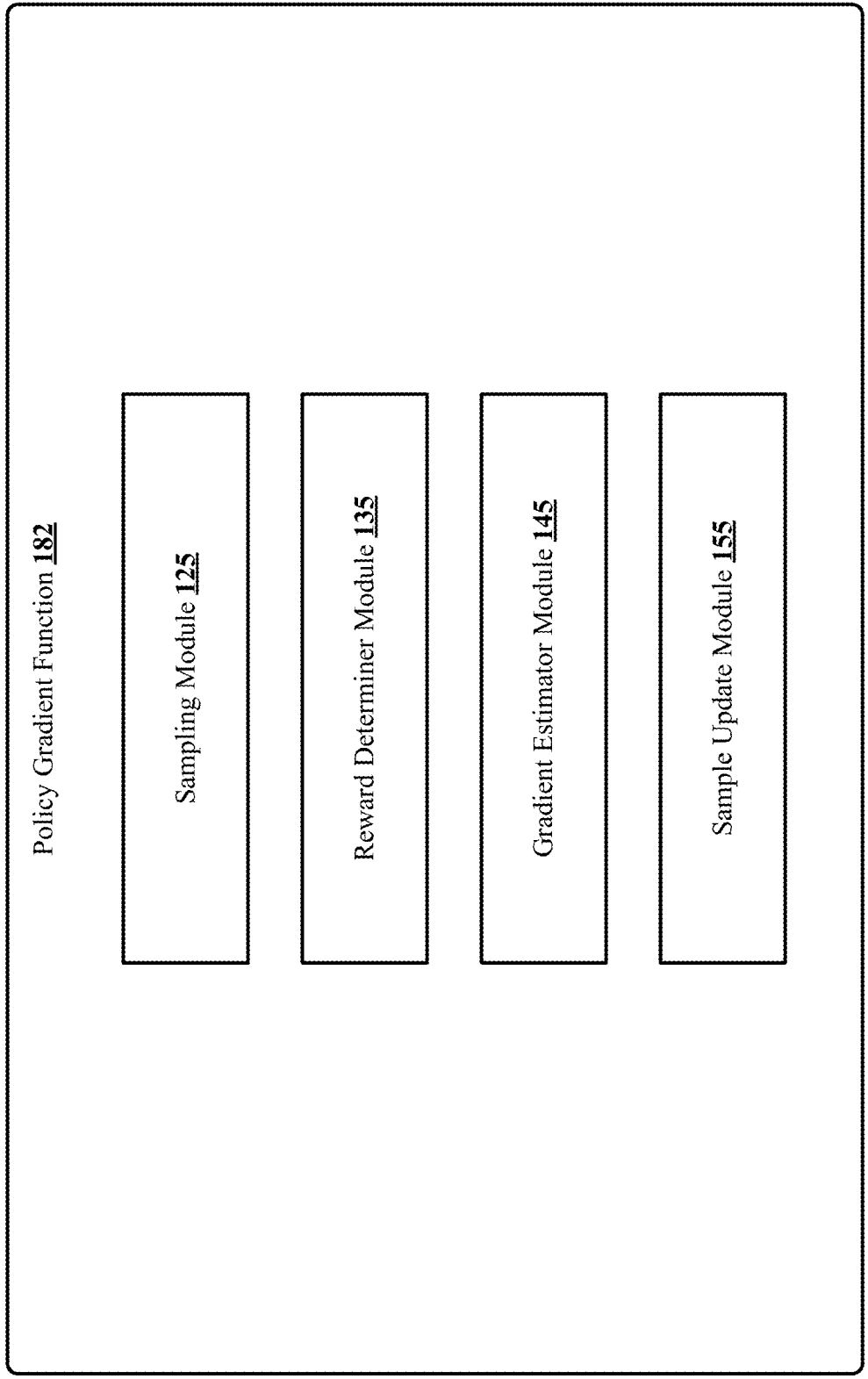
FIG. 3B shows some example modules of the policy gradient function of FIG. 1. These include a sampling module, a reward determiner module, a gradient estimator module, and a sample update module.

FIG. 3A illustrates a block diagram for trainer 152 that shows functional blocks for disclosed multi-objective learning criteria 162. Recurrent neural network (RNN) 352 is a neural network that has a memory that influences future predictions. Normalized input speech data 255 with input spectrogram 362 is input to RNN 352 which outputs T softmax vectors for k different paths, as a sequence of softmax probabilities 354. Connectionist temporal classification (CTC) maximum likelihood objective function (MLOF) 172 takes into account ground truth 386 and calculates error and gradients 348 which are fed back to RNN 352.

For the connectionist temporal classification (CTC), consider an entire neural network to be simply a function that takes in some input sequence of length T and outputs some output sequence y also of length T. As long as one has an objective function on the output sequence y, they can train their network to produce the desired output. The key idea behind CTC is that instead of somehow generating the label as output from the neural network, one instead generates a probability distribution at every time step and can then decode this probability distribution into a maximum likelihood label, and can train the network by creating an objective function that coerces the maximum likelihood decoding for a given input sequence to correspond to the desired label.

Connectionist temporal classification (CTC) 172 utilizes an objective function that allows RNN 352 to be trained for sequence transcription tasks without requiring any prior alignment between the input and target sequences. The output layer contains a single unit for each of the transcription labels, such as characters or phonemes plus an extra unit referred to as the "blank" which corresponds to a null emission. Given a length T input sequence X, the output vectors $y_t$ are normalized with the softmax function, then interpreted as the probability of emitting the label or blank with index k at time t:

$$Pr(k, t \mid x) = \frac{\exp(y_t^k)}{\sum_{k'} \exp(y_t^{k'})}$$

where $y_t^k$ is an element k of $y_t$.

A CTC alignment a is a length T sequence of blank and label indices. The probability Pr(a|x) of a is the product of the emission probabilities at every time-step:

$$Pr(a \mid x) = \prod_{t=1}^{T} Pr(a_t, t \mid x).$$

For a given transcription sequence, that are as many possible alignments as there are different ways of separating the labels with blanks. For example, using "-" to denote blanks, the alignments (a,-,b,c,-,-) and (-,-,a,-,b,c) both correspond to the transcription (a,b,c).

When the same label appears on successive time-steps in an alignment, the repeats are removed. Therefore, (a, b,b,b, c,c) and (a,-,b-,c,c) also correspond to (a,b,c). Denoting by β an operator that removes first the repeated labels, then the blanks from alignments, and observing that the total probability of an output transcription y is equal to the sum of the probabilities of the alignments corresponding to it, $$Pr(y \mid x) = \sum_{a \in \beta^{-1}(y)} Pr(a \mid x)$$

This "integrating out" over possible alignments is what allows the network to be trained with unsegmented data. The intuition is that, because we don't know where the labels within a particular transcription will occur, we sum over all the places where they could occur. Pr(y|x) can be efficiently evaluated and differentiated using a dynamic programming algorithm. Give the target transcription y*, the network can then be trained to minimize the CTC objective function:

$$CTC(x) = -\log Pr(y^* \mid x)$$

The log likelihood reflects the log probability of getting the whole transcription completely correct. What it ignores are the probabilities of the incorrect transcriptions. In other words, all incorrect transcriptions are equally bad, which is clearly not the case. Furthermore, the performance metrics typically aim to reflect the plausibility of incorrect predictions. For example, WER penalizes less for a transcription that has less edit distance to the ground truth label. This results in a disparity between the optimization objective of the model and the (commonly discrete) evaluation criteria. This mismatch is mainly attributed to the inability to directly optimize the criteria.

One way to remedy this mismatch is to view the described problem in the policy learning framework of reinforcement learning, which is implemented by the policy gradient function 182. In this framework, one can view the deep speech recognition model (RNN 352) as an agent and the training samples (speech data 255) as the environment. The parameters of the model θ define a policy Prθ(y|x). The model interacts with the environment by following this policy. The agent then performs an action based on its current state, in which case the action is the generated transcriptions and the state is the model's hidden representations of its state $(h_1, h_2, \ldots, h_t)$.

In implementations, the policy gradient function 182 comprises a sampling module 125, which during training, samples a word or character from each time step prediction of the RNN 352, and concatenates the sampled values to produce a whole transcription. In one implementation, the sampling is random. In other implementations, the sampling is pseudo-random and follows a predetermined range-based selection scheme.

Figure 4:
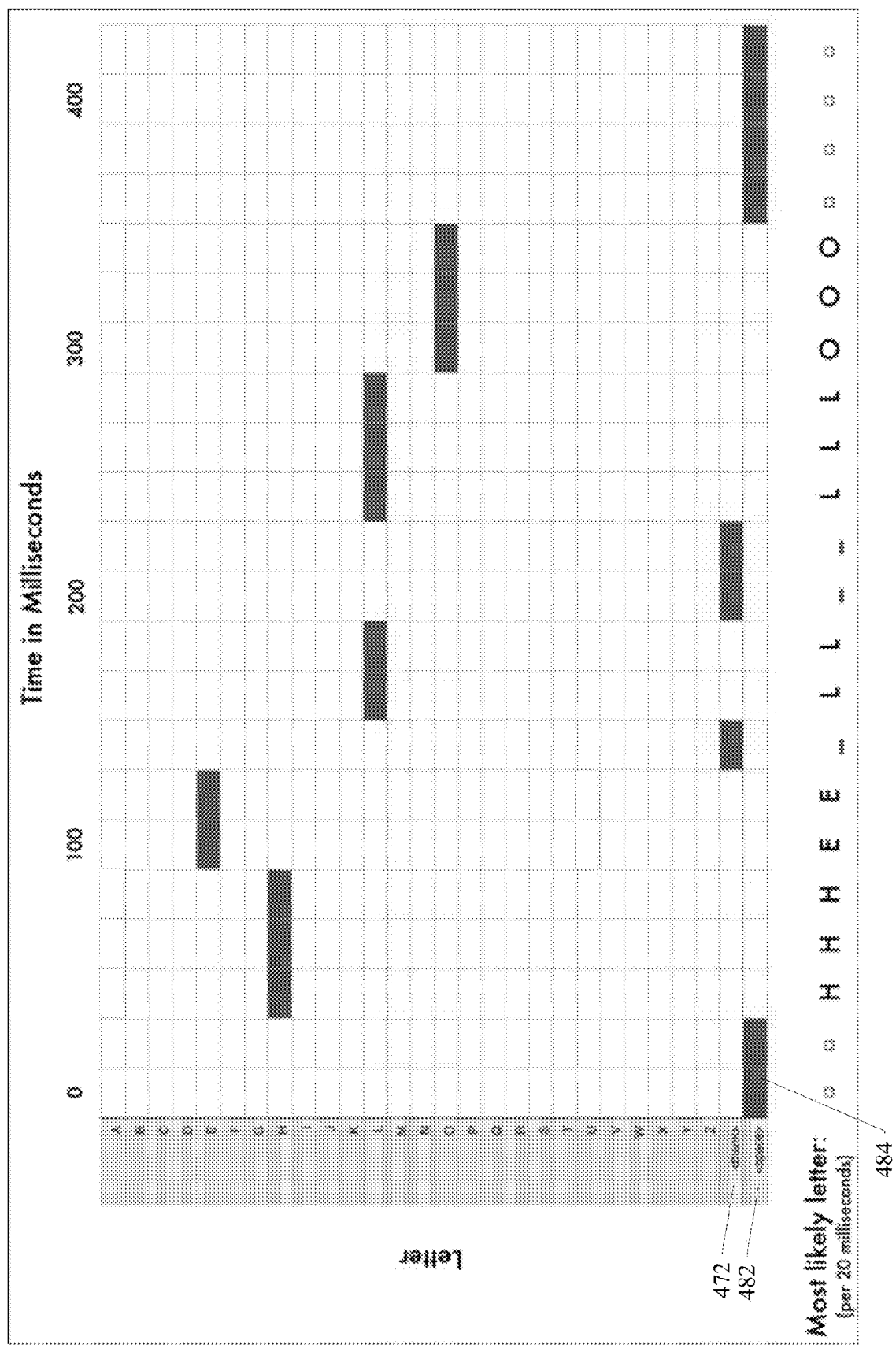
FIG. 4 shows an example whole transcription sampled by the sampling module of FIG. 3B.

FIG. 4 shows an example whole transcription sampled by the sampling module 125 from softmax probabilities generated by the RNN 352 after processing a speech sample annotated with a "HALO" transcription. The illustrated example would use CER as the evaluation metric. Another example could include words instead of characters, and calculate WER. In FIG. 4, the x axis shows the letters predicted for each 20 ms window, and the y axis lists the twenty-six letters of the alphabet and blank 472 and space 482. The bright red entries correspond to letters sampled by the sampling module 125. The sampled whole transcription is "HHHEE_LL_LLLOOO". In some implementations, a collapsing module (not show) enforces CTC collapsing rules and removes repeated letters and blanks to produce a final whole transcription "HELLO".

Upon generating the whole transcription "HELLO", a reward determiner module 135 observes a reward that is defined from the evaluation metric calculated on the current sample, such as "1−WER" or "1−CER" for the current transcription. In the illustrated example, the reward can be defined as the CER between the sampled transcription "HELLO" and the ground truth label "HALO". The goal of training can be to obtain a policy that minimizes the negative expected reward. In other implementations, the goal of training can be to maximize the positive expected reward. The detailed equations are enumerated in the document titled "Improving End-To-End Speech Recognition with Policy Learning" which is included in U.S. Provisional Application No. 62/578,369, entitled "End-To-End Speech Recognition with Policy Learning" which is incorporated by reference herein.

The gradient for minimizing the negative expected reward for a current sampled transcription can be obtained a gradient estimator module 145 using a REINFORCE algorithm to make weight adjustments in a direction that lies along the gradient of expected reinforcement without explicitly computing gradient estimates or storing information from which such estimates could be computed. In one example, the gradient can be obtained through REINFORCE as:

$$\Delta_\theta L_P(\theta) \approx -r(y^s) \Delta_\theta \log P_\theta(y^s|x) \text{ policy gradient 732}$$

which shows the Monte Carlo approximation of the gradient with a single example, which is a common practice when training the model with a stochastic gradient descent algorithm like ADAM. The policy gradient obtained from minimizing the negative expected reward is often of high variance, and the training can get unstable.

A sample update module 155 uses the chain rule (backpropagation) to update the softmax activations/probabilities of the sampled values and model parameters of RNN 352 based on the gradients estimated by the gradient estimator module 145 from the expected rewards on sample-by-sample basis. Accordingly, samples from the RNN 352 that return higher reward are "pushed UP", or increased in probability, while samples which result in lower reward are suppressed.

Learning can be slow and unstable at the beginning of training with policy gradient methods, including SCST, because it is unlikely for the deep end-to-end speech recognition model 132 to have reasonable output at the beginning stage, which leads to implausible samples with low rewards. Learning will be slow in the case of a small learning rate and unstable otherwise. In SCST, the policy gradient is computed with a baseline, which is the greedy output from the model, which is calculated using:

$$\Delta_\theta L_P(\theta) \approx -(r(y^s) - r(\hat{y})) \Delta_\theta \log P_\theta(y^s|x) \text{ policy gradient 742}$$

The disclosed method remedies the problem of slow and unstable learning by incorporating maximum likelihood objective implemented by the CTC MLOF 172 along with policy gradient implemented by the policy gradient function 182, since in maximum likelihood the probability is evaluated on the ground truth targets, and hence will get large gradients when the model output is incorrect. This leads to the following multi-objective learning criteria 162 for training the end-to-end speech model:

$$L(\theta) = \log P_\theta(y|x) + \lambda L_{SCST}(\theta) \text{ where}$$

$$L_{SCST}(\theta) = -\{g(y^s,y) - g(\hat{y},y)\} \log P_\theta(y^s|x)$$

where $g(\cdot,\cdot)$ represents the reward function and $\lambda \in (0, +\infty)$ is the coefficient that controls the contribution from SCST. In the example case, $g(\cdot, y) = 1 - \max(1, \text{WER}(\cdot, y))$. Training with the defined objective is efficient, since both sampling and greedy decoding are cheap. The reward calculation need only be computed twice per batch of examples, adding only a minimal overhead. SCST is a form of REINFORCE algorithm that, rather than estimating a baseline to normalize the rewards and reduce variance, utilizes the output of its own test-time inference algorithm to normalize the rewards it experiences.

Each letter predicted by the multi-objective learning criteria 162 affects the likelihood of the next letter it will predict too. In a simple example, if an audio file recording has said "HEL" so far, it is very likely that it will say "LO" next to finish out the word "Hello". It is much less likely that it will say something unpronounceable next like "XYZ". So having that memory of previous predictions helps the neural network make more accurate predictions going forward.

In implementations, trainer 152 trains the RNN 352 using the multi-objective learning criteria 162 over thousand to millions of backpropagation iterations. The training can be implemented using a stochastic gradient descent/ascent approach such as ADAM.

The disclosed technology includes training a deep end-to-end speech recognition model, on thousands to millions of original speech samples and the sample speech variations on the original speech samples, that outputs recognized text transcriptions corresponding to speech detected in the speech samples. The disclosed model has over five million parameters, making regularization important for the speech recognition model to generalize well. The model architecture is described next.

Figure 5:
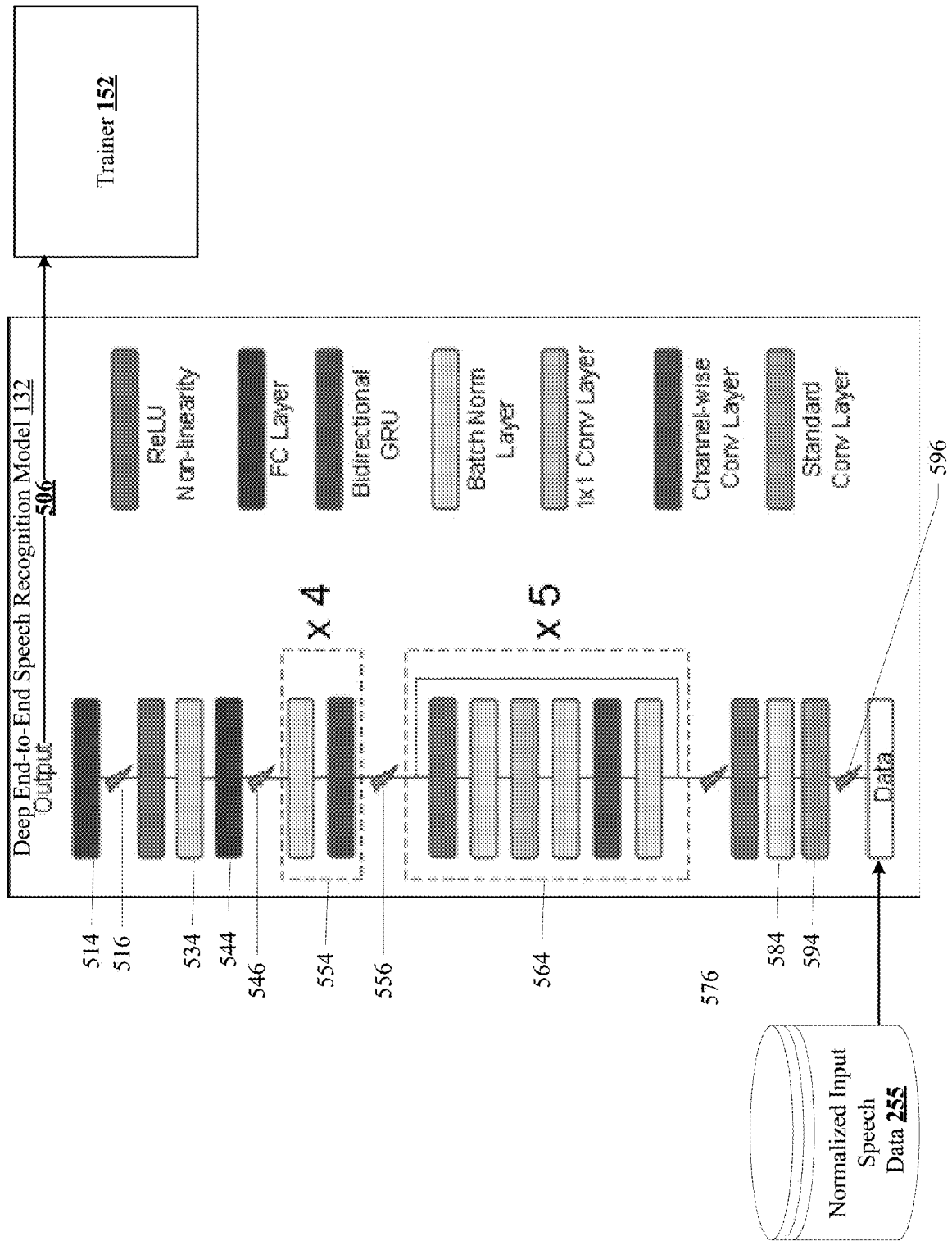
FIG. 5 shows a block diagram for the model for normalized input speech data and the deep end-to-end speech recognition, and for training, in accordance with one or more implementations of the technology disclosed.

FIG. 5 shows the model architecture for deep end-to-end speech recognition model 132 whose full end-to-end model structure is illustrated. Different colored blocks represent different layers, as shown in the legend on the right side of block diagram of the model. A stack of convolution layers in the front-end are included for feature extraction, with time and frequency convolution, to model both the temporal transitions and spectral variations in speech utterances. A stack of recurrent layers are included for sequence modeling. First, deep end-to-end speech recognition model 132 uses depth-wise separable convolution for all the convolution layers. The depth-wise separable convolution is implemented by first convolving 594 over the input channel-wise, and then convolving with 1×1 filters with the desired number of channels. Stride size only influences the channel-wise convolution; the following 1×1 convolutions always have stride (subsample) size of one.

Continuing the description of FIG. 5, deep end-to-end speech recognition model 132 is composed of one standard convolution layer 594 that has larger filter size, followed by five residual convolution blocks 564. Convolutional features are then given as input to a 4-layer bidirectional recurrent neural network 554 with gated recurrent unit (GRU) layers. Finally, two fully-connected (abbreviated FC) layers 544, 514 take the last hidden RNN layer as input and output the final per-character prediction 506. Batch normalization 584, 534 is applied to all layers to facilitate training.

FIG. 6 shows the equations for operations performed by the depth-wise separable convolution with D input channels and N output channels, for an input sample $X \in \mathfrak{R}^{W \times H \times D}$ with channel-wise convolution $c \in \mathfrak{R}^{W \times H \times D}$ and 1×1 convolution-weights $w \in \mathfrak{R}^{D \times N}$, where s 645 is the channel-wise convolution result, o 655 is the result from depth-wise separable convolution, $d \in \{1, \ldots, D\}$ and $n \in \{1, 2, \ldots, N\}$. A residual connection is also added between the input and the layer output for the depth-wise separable convolution to facilitate training.

Continuing the description of the model, the size of the convolution layer is denoted by tuple (C, F, T, SF, ST), where C, F, T, SF, and ST denote number of channels, filter size in frequency dimension, filter size in time dimension, stride in frequency dimension and stride in time dimension respectively. The model has one convolutional layer with size (32,41,11,2,2), and five residual convolution blocks of size (32,7,3,1,1), (32,5,3,1,1), (32,3,3,1,1), (64,3,3,2,1), (64, 3,3,1,1) respectively. Following the convolutional layers, the model has 4 layers of bidirectional GRU RNNs with 1024 hidden units per direction per layer. Finally the model has one fully connected hidden layer of size 1024 followed by the output layer. The convolutional and fully connected layers are initialized uniformly. The recurrent layer weights are initialized with a uniform distribution $U(-1/32; 1/32)$.

Further continuing the description of the model, dropout prevents the coadaptation of hidden units by randomly zeroing out a subset of inputs for that layer during training. Deep end-to-end speech recognition model 132 includes applying dropout to each input layer of the network. Triangles 596, 576, 556, 546 and 516 are indicators that dropout happens right before the layer to which the triangle points. The dropout probabilities are set as 0.1 for data, 0.2 for all convolution layers, and 0.3 for all recurrent and fully connected layers. In another implementation, the dropout probabilities can be set with different values.

The model is trained in an end-to-end fashion to minimize the mixed objective for training the end-to-end speech model described supra: using mini-batch stochastic gradient descent with batch size 64, learning rate 0.1, and with Nesterov momentum 0.95. The learning rate is reduced by half whenever the validation loss has plateaued, and the model is trained until the validation loss stops improving. The norm of the gradient is clipped to have a maximum value of 1.

FIG. 5 illustrates the input for the model as normalized input speech data 255 and final per-character prediction 506 output of deep end-to-end speech recognition model 132 is input to trainer 152. The input to the model is a spectrogram computed with a 20 ms window and 10 ms step size, as described relative to FIG. 2.

Experiments on the Wall Street Journal (WSJ) and Libri Speech datasets illustrate the effectiveness of the disclosed multi-objective policy learning. The first set of experiments was carried out on the WSJ corpus, using the standard si284 set for training, dev93 for validation and eval92 for test evaluation. Using the provided language model, the results are reported in the 20K closed vocabulary setting with beam search. The beam width is set to 100. Results of experiments performed on both datasets with various settings are described next.

The disclosed model performance is competitive with other end-to-end speech models on both the WSJ and the LibriSpeech datasets. In general, a machine learning dataset has a training set and a separate testing set. One uses only the data in the training set to train the model and evaluates on the testing set, to ensure a fair comparison metric for people working on the same problem. The more training data one has, the more likely it becomes that one will have a better-performing model at test time.

FIG. 7A shows a table of the word error rate results from the WSJ dataset. Baseline 722 denotes the model trained with CTC only. Policy gradient methods 732, 742 improve results over baseline. In particular, the use of SCST results in 13.8% relative performance improvement on the eval92 set over the baseline: (6.42% 726−5.53% 746)/6.42% 726=13.8%.

FIG. 7B shows performance of the model when utilizing the LibriSpeech dataset. Our model achieves 5.42% 764 and 14.70% 784 WER on LibriSpeech test-clean and test-other sets. Policy 754 denotes results when the model is trained with the disclosed multi-objective objective that incorporates maximum likelihood objective along with policy gradient, described in detail supra. Using the LibriSpeech dataset, the model is trained using all 960 hours of training data. Both dev-clean 762 and dev-other 772 are used for validation. The provided 4-gram language model is used for final beam search decoding. The beam width is also set to 100 for decoding. Overall, a relative approximate 4% performance improvement over the baseline is observed.

FIG. 7C shows comparative results with other end-to-end methods on WSJ eval92 dataset. Our model achieves 5.53% WER 768 on Wall Street Journal dataset. Ours (LibriSpeech) 766 denotes the disclosed model trained using LibriSpeech dataset only, and tested on WSJ. FIG. 7D shows comparative results with other end-to-end methods on LibriSpeech dataset. Amodei et al. 756 used more training data—including external data that is outside the training data of the WSJ dataset. WSJ has 80 hours of training data. Amodei et al. target a usable system that is not focused on setting up a benchmark result, so they used 11,940 hours of training data. Therefore, their result is not a fair comparison to all others. However, since their work is an influential work for end-to-end speech recognition, people also tend to compare with their results, so their results are included in FIG. 7C and FIG. 7D. Note that their external data includes data that is not publicly available, so the disclosed system is not trained on the same dataset as theirs and compared. The disclosed model achieved competitive performance with other methods on both datasets, as illustrated in FIG. 7C and FIG. 7D. In particular, with the help of policy learning, the disclosed method achieved similar results as Amodei et al. on LibriSpeech without using additional data. To see whether the disclosed model generalizes, the disclosed LibriSpeech model was also tested on the WSJ dataset. The result is significantly better than the model trained on WSJ data which suggests that the end-to-end models benefit more when more data is available.

The disclosed methods close the gap between the maximum likelihood training objective and the final performance metric for end-to-end speech models. Test results show that this gap can be reduced by using the policy gradient method along with the negative log-likelihood. In particular, we apply a multi-objective training with SCST to reduce the expected negative reward that is defined by using the final metric. The joint training is computationally efficient. We show that the joint training is effective even with single sample approximation, which improves the relative performance on WSJ and Libri Speech by 13% and 4% over the baseline.

Computer System

Figure 8:
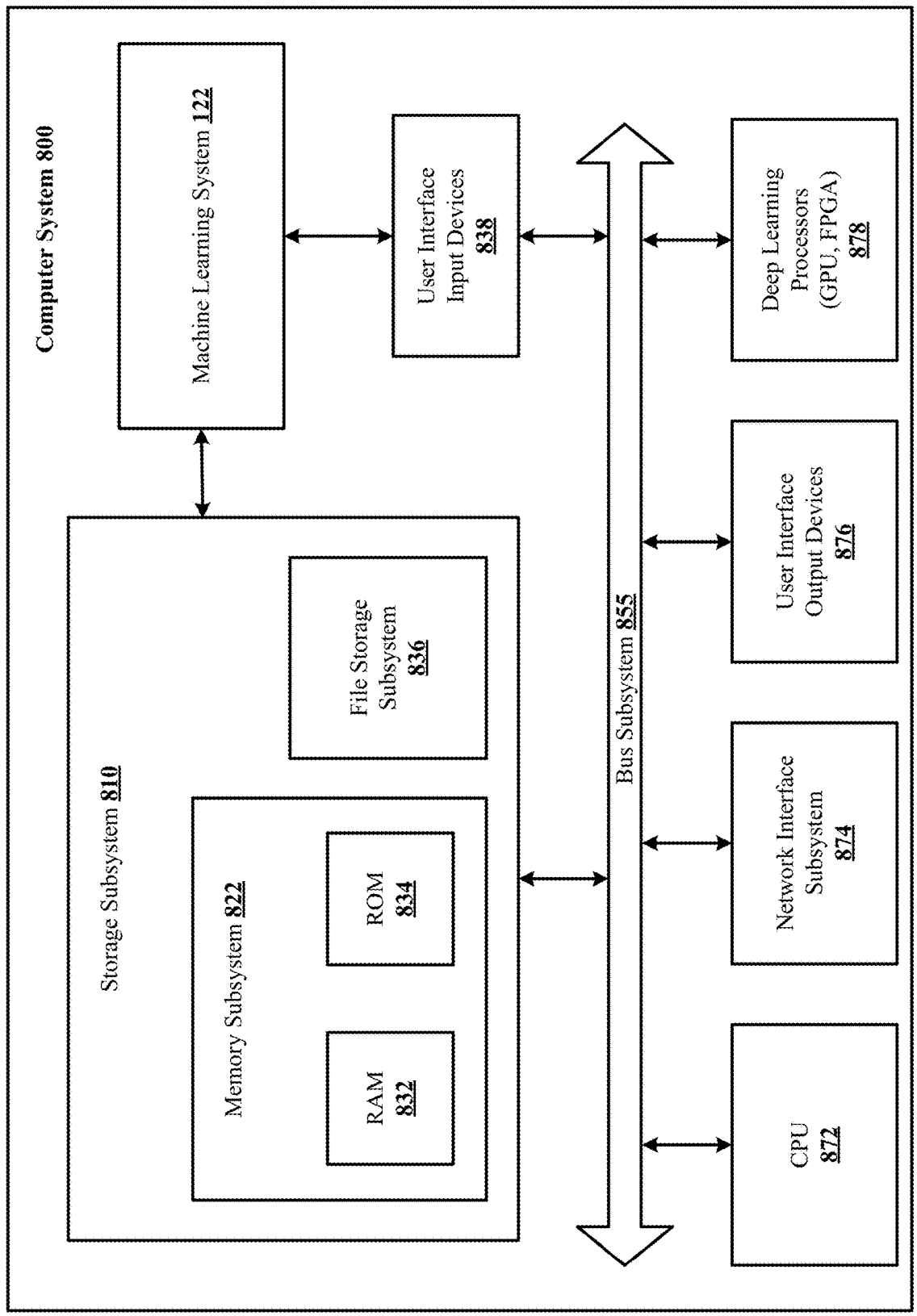
FIG. 8 is a block diagram of an exemplary system for jointly training, with maximum likelihood and policy gradient, a deep neural network based, end-to-end speech recognition model, in accordance with one or more implementations of the technology disclosed.

FIG. 8 is a simplified block diagram of a computer system 800 that can be used to implement the machine learning system 122 of FIG. 1 for regularizing a deep end-to-end speech recognition model to reduce overfitting and improve generalization. Computer system 800 includes at least one central processing unit (CPU) 872 that communicates with a number of peripheral devices via bus subsystem 855. These peripheral devices can include a storage subsystem 810 including, for example, memory devices and a file storage subsystem 836, user interface input devices 838, user interface output devices 876, and a network interface subsystem 874. The input and output devices allow user interaction with computer system 800. Network interface subsystem 874 provides an interface to outside networks, including an interface to corresponding interface devices in other computer systems.

In one implementation, the machine learning system 122 of FIG. 1 is communicably linked to the storage subsystem 810 and the user interface input devices 838.

User interface input devices 838 can include a keyboard; pointing devices such as a mouse, trackball, touchpad, or graphics tablet; a scanner; a touch screen incorporated into the display; audio input devices such as voice recognition systems and microphones; and other types of input devices.

In general, use of the term "input device" is intended to include all possible types of devices and ways to input information into computer system 800.

User interface output devices 876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 800 to the user or to another machine or computer system.

Storage subsystem 810 stores programming and data constructs that provide the functionality of some or all of the modules and methods described herein. These software modules are generally executed by deep learning processors 878.

Deep learning processors 878 can be graphics processing units (GPUs) or field-programmable gate arrays (FPGAs). Deep learning processors 878 can be hosted by a deep learning cloud platform such as Google Cloud Platform™, Xilinx™, and Cirrascale™. Examples of deep learning processors 878 include Google's Tensor Processing Unit (TPU)™, rackmount solutions like GX4 Rackmount Series™, GX8 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 822 used in the storage subsystem 810 can include a number of memories including a main random access memory (RAM) 832 for storage of instructions and data during program execution and a read only memory (ROM) 834 in which fixed instructions are stored. A file storage subsystem 836 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 836 in the storage subsystem 810, or in other machines accessible by the processor.

Bus subsystem 855 provides a mechanism for letting the various components and subsystems of computer system 800 communicate with each other as intended. Although bus subsystem 855 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 800 depicted in FIG. 8 is intended only as a specific example for purposes of illustrating the preferred embodiments of the present invention. Many other configurations of computer system 800 are possible having more or less components than the computer system depicted in FIG. 8.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed computer-implemented method of training a deep end-to-end speech recognition model includes using a multi-objective learning criteria to train a deep end-to-end speech recognition model on training data comprising speech samples temporally labeled with ground truth transcriptions, wherein the multi-objective learning criteria updates model parameters of the model over one thousand to millions of backpropagation iterations by combining, at each iteration, a maximum likelihood objective function that modifies the model parameters to maximize a probability of outputting a correct transcription and a policy gradient function that modified the model parameters to maximize a positive reward defined based on a non-differentiable performance metric which penalizes incorrect transcriptions in accordance with their conformity to corresponding ground truth transcriptions; and upon convergence after a final backpropagation iteration, persisting the modified model parameters learned by using the multi-objective learning criteria with the model to be applied to further end-to-end speech recognition. Convergence is a term of art used in deep learning to indicate that the model has been fully trained and the weight coefficients of the network have "converged" or the error has descended to a local minima.

This method and other implementations of the technology disclosed can include one or more of the following features and/or features described in connection with additional methods disclosed. In the interest of conciseness, the combinations of features disclosed in this application are not individually enumerated and are not repeated with each base set of features.

For one implementation of the disclosed method, for each timestep, the model produces a normalized distribution of softmax probabilities over a set of transcription labels, including a blank label. The disclosed maximum likelihood objective function is a connectionist temporal classification (abbreviated CTC) objective function that maximizes the probability of outputting the correct transcription by combining individual probabilities of a plurality of candidate output transcriptions to produce an output transcription, wherein an individual probability of a candidate output transcription is determined by selecting a most probable label for each timestep and multiplying softmax probabilities of each of the selected labels; and measuring differences between the output transcription and a ground truth transcription. The disclosed policy gradient function determines the reward for an output transcription by independently sampling a transcription label for each timestep and concatenating the transcription labels sampled across the timesteps to produce the output transcription; and measuring differences between the output transcription and a ground truth transcription based on the performance metric.

In one implementation of the disclosed method, the performance metric is word error rate (abbreviated WER). In other implementations, the performance metric is character error rate (abbreviated CER). In some implementations, the reward is determined based on a reward function that is defined as 1−WER. For the disclosed method, the policy gradient function minimizes a negative reward defined based on the performance metric.

In one implementation of the disclosed method, the policy gradient function is applied using self-critical sequence training (abbreviated SCST).

In some implementations of the disclosed method, the relative reliance on the maximum likelihood objective function and the policy gradient function shifts during training, with greater emphasis on the maximum likelihood objective function early in training than late in training.

The disclosed model has between one million and five million parameters.

Some implementations of the disclosed method further include regularizing the model by applying variant dropout to inputs of convolutional and recurrent layers of the model. The recurrent layers of this system can include LSTM layers, GRU layers, residual blocks, and/or batch normalization layers.

One implementation of a disclosed deep end-to-end deep speech recognition system includes a an input port that receives digital audio samples of a signal comprising speech; a deep end-to-end speech recognition processor comprising hardware and a stack of layers running on the hardware including convolution layers and recurrent layers, coupled to the input port and configurable to process the digital audio samples, recognize speech from the audio samples, and output transcriptions corresponding to recognized speech. For the disclosed speech recognition system, the deep end-to-end speech recognition processor includes parameters trained using a multi-objective learning criteria on training data comprising speech samples temporally labeled with ground truth transcriptions; and wherein the multi-objective learning criteria update the processor parameters over one thousand to millions of backpropagation iterations by combining, at each iteration, a maximum likelihood objective function that modified the processor parameters to maximize a probability of outputting a correct transcription and a policy gradient function that modified the processor parameters to maximize a positive reward defined based on a non-differentiable performance metric which penalizes incorrect transcriptions in accordance with their conformity to corresponding ground truth transcriptions.

In another implementation, a disclosed system includes one or more processors coupled to memory, the memory impressed with computer instructions, the instructions, when executed on the processors, implement actions of the disclosed method described supra.

This system implementation and other systems disclosed optionally include one or more of the features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In yet another implementation a disclosed tangible non-transitory computer readable storage medium impressed with computer program instructions to train a deep end-to-end speech recognition model. The instructions, when executed on a processor, implement the disclosed method described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A computer-implemented method of training a deep end-to-end speech recognition model, the method including:
    using a multi-objective learning criteria to train a deep end-to-end speech recognition model on training data comprising speech samples temporally labeled with ground truth transcriptions, wherein the multi-objective learning criteria updates model parameters of the model over one thousand to millions of backpropagation iterations by combining, at each iteration,
    a maximum likelihood objective function that modifies the model parameters to maximize a probability of outputting a correct transcription and
    a policy gradient function that modified the model parameters to maximize a positive reward defined based on a non-differentiable performance metric which penalizes incorrect transcriptions in accordance with their conformity to corresponding ground truth transcriptions; and
    upon convergence after a final backpropagation iteration, persisting the modified model parameters learned by using the multi-objective learning criteria with the model to be applied to further end-to-end speech recognition.

2. The method of claim 1, wherein, for each timestep, the model produces a normalized distribution of softmax probabilities over a set of transcription labels, including a blank label.

3. The method of claim 2, wherein the maximum likelihood objective function is a connectionist temporal classification (abbreviated CTC) objective function that maximizes the probability of outputting the correct transcription by:
    combining individual probabilities of a plurality of candidate output transcriptions to produce an output transcription, wherein an individual probability of a candidate output transcription is determined by selecting a most probable label for each timestep and multiplying softmax probabilities of each of the selected labels; and measuring differences between the output transcription and a ground truth transcription.

4. The method of claim 2, wherein the policy gradient function determines the reward for an output transcription by:

independently sampling a transcription label for each timestep and concatenating the transcription labels sampled across the timesteps to produce the output transcription; and measuring differences between the output transcription and a ground truth transcription based on the performance metric.

5. The method of claim 1, wherein the performance metric is word error rate (abbreviated WER).

6. The method of claim 5, wherein the reward is determined based on a reward function that is defined as 1−WER.

7. The method of claim 1, wherein the performance metric is character error rate (abbreviated CER).

8. The method of claim 1, wherein the policy gradient function minimizes a negative reward defined based on the performance metric.

9. The method of claim 1, wherein the policy gradient function is applied using self-critical sequence training (abbreviated SCST).

10. The method of claim 1, wherein relative reliance on the maximum likelihood objective function and the policy gradient function shifts during training, with greater emphasis on the maximum likelihood objective function early in training than late in training.

11. A deep end-to-end speech recognition system, comprising:

an input port that receives digital audio samples of a signal comprising speech; and a deep end-to-end speech recognition processor comprising hardware and a stack of layers running on the hardware including convolution layers and recurrent layers, coupled to the input port and configurable to process the digital audio samples, recognize speech from the audio samples, and output transcriptions corresponding to recognized speech;

wherein the deep end-to-end speech recognition processor includes parameters trained using a multi-objective learning criteria on training data comprising speech samples temporally labeled with ground truth transcriptions; and wherein the multi-objective learning criteria update the processor parameters over one thousand to millions of backpropagation iterations by combining, at each iteration, a maximum likelihood objective function that modified the processor parameters to maximize a probability of outputting a correct transcription, and a policy gradient function that modified the processor parameters to maximize a positive reward defined based on a non-differentiable performance metric which penalizes incorrect transcriptions in accordance with their conformity to corresponding ground truth transcriptions.

12. The deep end-to-end speech recognition system of claim 11, wherein, for each timestep, the processor produces a normalized distribution of softmax probabilities over a set of transcription labels, including a blank label.

13. The deep end-to-end speech recognition system of claim 12, wherein the maximum likelihood objective function is a connectionist temporal classification (abbreviated CTC) objective function that maximizes the probability of outputting a correct transcription by:

combining individual probabilities of a plurality of candidate output transcriptions to produce an output transcription, wherein an individual probability of a candidate output transcription is determined by selecting a most probable label for each timestep and multiplying softmax probabilities of each of the selected labels; and measuring differences between the output transcription and a ground truth transcription.

14. The deep end-to-end speech recognition system of claim 11, wherein the policy gradient function determines the reward for an output transcription by:

independently sampling a transcription label for each timestep and concatenating the transcription labels sampled across the timesteps to produce the output transcription; and measuring differences between the output transcription and a ground truth transcription based on the performance metric.

15. The deep end-to-end speech recognition system of claim 11, wherein the performance metric is word error rate (abbreviated WER).

16. The deep end-to-end speech recognition system of claim 15, wherein the reward is determined based on a reward function that is defined as 1−WER.

17. The deep end-to-end speech recognition system of claim 11, wherein the performance metric is character error rate (abbreviated CER).

18. The deep end-to-end speech recognition system of claim 11, wherein the policy gradient function minimizes a negative reward defined based on the performance metric.

19. The deep end-to-end speech recognition system of claim 11, wherein the policy gradient function is applied using self-critical sequence training (abbreviated SCST).

20. The deep end-to-end speech recognition system of claim 11, where relative reliance on the maximum likelihood objective function and the policy gradient function shifts during training, with greater emphasis on the maximum likelihood objective function early in training than late in training.

21. A tangible non-transitory computer readable storage medium impressed with computer program instructions executable by a processor, the instructions, when executed on a processor, implement a method including:

using a multi-objective learning criteria to train a deep end-to-end speech recognition model on training data comprising speech samples temporally labeled with ground truth transcriptions, wherein the multi-objective learning criteria updates model parameters of the model over one thousand to millions of backpropagation iterations by combining, at each iteration, a maximum likelihood objective function that modified the model parameters to maximize a probability of outputting a correct transcription and a policy gradient function that modified the model parameters to maximize a positive reward defined based on a non-differentiable performance metric which penalizes incorrect transcriptions in accordance with their conformity to corresponding ground truth transcriptions; and upon convergence after a final backpropagation iteration, persisting the modified model parameters learned by using the multi-objective learning criteria with the model to be applied to further end-to-end speech recognition.

22. The tangible non-transitory computer readable storage medium of claim 21, wherein, for each timestep, the model produces a normalized distribution of softmax probabilities over a set of transcription labels, including a blank label.

23. The tangible non-transitory computer readable storage medium of claim 22, wherein the maximum likelihood objective function is a connectionist temporal classification (abbreviated CTC) objective function that maximizes the probability of outputting the correct transcription by:
- combining individual probabilities of a plurality of candidate output transcriptions to produce an output transcription, wherein an individual probability of a candidate output transcription is determined by selecting a most probable label for each timestep and multiplying softmax probabilities of each of the selected labels; and
- measuring differences between the output transcription and a ground truth transcription.

24. The tangible non-transitory computer readable storage medium of claim 21, wherein the policy gradient function determines the reward for an output transcription by:
- independently sampling a transcription label for each timestep and concatenating the transcription labels sampled across the timesteps to produce the output transcription; and
- measuring differences between the output transcription and a ground truth transcription based on the performance metric.

25. The tangible non-transitory computer readable storage medium of claim 21, where relative reliance on the maximum likelihood objective function and the policy gradient function shifts during training, with greater emphasis on the maximum likelihood objective function early in training than late in training.

* * * * *